United States Patent [19]

Matsuda et al.

[11] Patent Number: 5,232,952

[45] Date of Patent: Aug. 3, 1993

[54] FINELY DISPERSED METAL-CARRYING COMPOUNDS AND METHOD FOR PREPARING THE SAME

[75] Inventors: Masaaki Matsuda, Osaka; Masao Minobe, Ehime, both of Japan

[73] Assignee: Sumitomo Chemical Co., Ltd., Osaka, Japan

[21] Appl. No.: 273,353

[22] Filed: Nov. 18, 1988

[30] Foreign Application Priority Data

Nov. 19, 1987 [JP] Japan ................. 62-293708

[51] Int. Cl.$^5$ ............................... C08J 5/20
[52] U.S. Cl. ...................... 521/28; 521/30; 528/481
[58] Field of Search .............. 521/28, 30; 528/481

[56] References Cited

U.S. PATENT DOCUMENTS

| | | | |
|---|---|---|---|
| 3,493,343 | 2/1970 | Logan et al. | 23/207 |
| 3,979,329 | 9/1976 | Cooper | 252/422 |
| 4,040,990 | 8/1977 | Neely | 521/29 |

FOREIGN PATENT DOCUMENTS 0120604 10/1934 European Pat. Off.

OTHER PUBLICATIONS

Encyclopedia of Polymer Science and Technology, vol. 8, pp. 381–385.
Encyclopedia of Polymer Science and Technology, vol. 3, pp. 363–367.
Kirk–Othmer Encyclopedia of Chemical Technology, vol. 5, pp. 344–5, 361–8.
Technical sheet for "Duolite C-20".
Technical sheet for "Duolite A-101D".
Summary Chart for "Amberlite".
Hydrometallurgy, vol. 12, No. 3, Jul. 1984, pp. 387–400.
Chemical Abstracts, vol. 89, No. 16, Oct. 16, 1978, Abstract No. 136334g.

Primary Examiner—Thurman K. Page
Assistant Examiner—Peter F. Kulkosky
Attorney, Agent, or Firm—Cushman, Darby & Cushman

[57] ABSTRACT

Finely dispersed metal-carrying compound whose metal has 50 Å or less in size, which is useful as, for instance, catalysts and electrically conducting agents, is prepared by heating ion-exchange resin on which metal ion such as Pt ion is adsorbed, at 300°–1500° C. under an inert gas atmosphere, and, if desired, reducing.

7 Claims, 1 Drawing Sheet

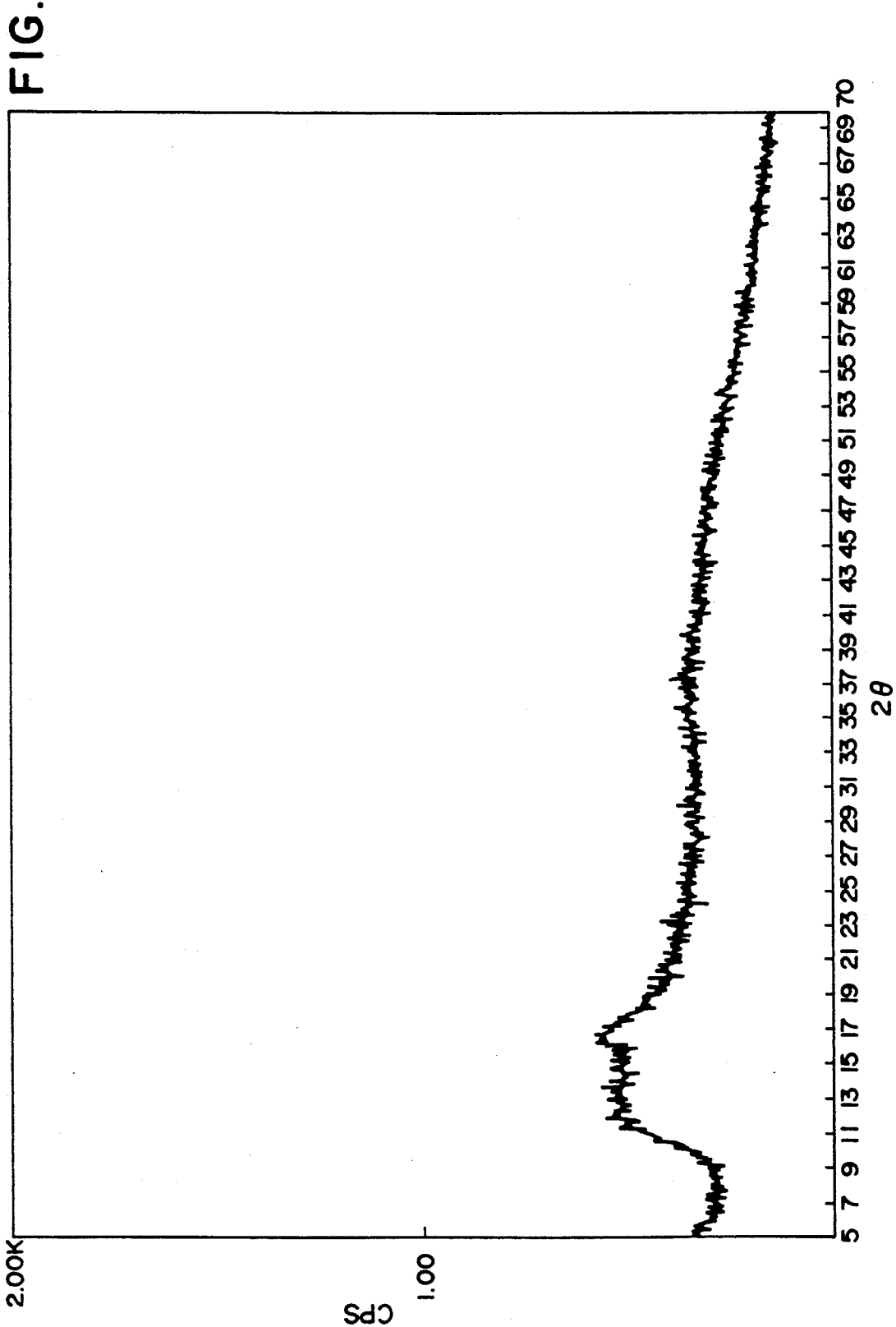

FINELY DISPERSED METAL-CARRYING COMPOUNDS AND METHOD FOR PREPARING THE SAME

The present invention relates to finely dispersed metal-carrying compounds and a method for preparing the same. The compounds are useful for catalysts, antifouling agents, specific gravity-increasing agents of carriers, electrically conducting agents and magnetizing agents.

Solid compounds having large specific surface area, such as activated carbon, silica gel and diatomaceous earth on which metals are carried, are commercially familiar as metallic catalysts. They are prepared by immersing metal salts in or adsorbing them on the solid compounds and then treating the compounds with molecular hydrogen or other reducing agents until the metal salts are reduced to produce fine particles of the metals. However, physical and chemical properties of such conventional metal-carrying compounds are not uniform and, when the compounds are used as, for example, catalysts, difficulties are encountered when regeneration is made. The particles of metals carried have 100–1000 Å of diameter in size, since secondary growth of metal particles occurs during the reduction step. Furthermore, particle size distribution is not uniform, either.

Under the situation above, compounds carrying metal particles having uniform particle size distribution and smaller particle size have been desired.

The present invention provides finely dispersed metal-carrying compounds where the metal has 50 Å or less of diameter in size. The present invention further provides a method for preparing the compounds, which comprises heating ion-exchange resin on which metal ion is adsorbed.

The ion exchange resin used in this invention includes, for example, ion-exchange chelate resin having a polyalkylene polyamine group such as "Sumikaion" ® KA890 (Sumitomo Chemical Company, Limited) and "Diaion" ® WA-21 (Mitsubishi Kasei Co., Ltd.); ion-exchange chelate resin having an aminocarboxylic acid group such as "Sumichelate" ® MC-75, MC-76 and MC-30 (Sumitomo Chemical Company, Limited), "Uniselex" ® UR-10 and UR-50 (Unitika Co. Ltd.) and "Diaion" ® CR-10 (Mitsubishi Kasei Co. Ltd.); ion-exchange chelate resin having an aminophosphoric acid group such as "Sumichelate" ® MC-95 and MC-90 (Sumitomo Chemical Company, Limited), "Duolite" ® ES-467 (Duolite International Co.) and "Uniselex" ® UR-3300 (Unitika Co. Ltd.); ion-exchange resin having weakly basic and/or not so strong basic groups such as "Amberlite" ® IR-93 (Rohm and Haas Co.), "Duolite" ® A-7, 30B and A-375 (Duolite International Co.), "Sumikaion" ® KA-900 and "Sumichelate" ® CR-2 (Sumitomo Chemical Company, Limited); ion-exchange resin having a weakly acidic group such as "Duolite" ® C-464 and C-463 (Duolite International Co.); ion-exchange resin having a strongly acidic group such as "Sumikaion" ® KC-470 (Sumitomo Chemcial Company, Limited), "Duolite" ® C-20 and C-26 (Duolite International Co.), "Diaion" ® PK 204 and PK 228 (Mitsubishi Kasei Co. Ltd.); and ion-exchange resin having a strongly basic group such as "Duolite" ® A-101D, A-161, A-102D and A-162 (Duolite International Co.) and "Diaion" ® SA10A and SA20A (Mitsubishi Kasei Co. Ltd.). Any other ion-exchange resin may be used as long as a metal is able to bond in the form of ion-bond via an ion-exchange group. Ion-exchange resins such as those having a polyalkylene polyamine group, an aminocarboxylic acid group and/or an aminophosphoric acid group are preferred, since secondary growth of metal during the heating step is controlled.

Any metal is employed in the present invention, as long as it is able to bond with ion-exchange resin in such an ion-bond manner. Preferred metals are those of the Mendelejeff's Periodic Table, Group VIII, such as Pt, Pd, Rh, Ru, Ni, Co and Fe; Group IB, such as Au, Ag and Cu; Group VIB, such as Mo, W and Cr and Group IIIB, such as Th, Ce, Y, La, Nd, Gd, Ho, Er and Pr. More preferred are Pt, Au, Pd and Rh which are stably dispersed after the heating.

Preferred form of metal after being carried is metal of valency zero, metal salt, metal oxide or metal acid. The form varies depending on the use of the finely dispersed metal-carrying compounds (hereinafter referred to as a product compound). Conversion to the desired form may be made by any of the known methods after ion-bond to ion-exchange resin is finished which is mentioned below.

The method for preparing the present compounds is explained below.

The First Step

The ion-exchange resin is brought into contact with solution of compounds of metals above mentioned, until the compounds are adsorbed on the ion-exchange resin.

Any contacting method is employed. Conditions for the contact are ready determined by preliminary tests. Said conditions are varieties of metal compounds to be carried and of ion-exchange resin, concentrations of metal compounds in solution, amounts of the solution and ion-exchange resin, temperature at which the contact is made, a period of time for contact, and amount of metal compound to be adsorbed.

Amount of metal to be adsorbed on ion-exchange resin is 50% by weight, at the highest, on the basis of ion-exchange resin. Preferable amount varies depending on the use of the product compound.

Metal ion is dispersed and adsorbed on ion-exchange resin in such a manner that metal ion is present at intervals of 2—several tens Å on an ion-exchange group which is present at the same interval as above.

The ion-exchange resin obtained is used as a catalyst without any after-treatment. However, heating is applied to in order to improve physical and chemical properties such as heat resistance, chemical resistance and specific surface area.

The Second Step

A heat treatment is applied to the ion-exchange resin without any treatment or after a chemical treatment, for example, reduction, is made.

Conditions for the heat treatment vary depending on the use of the product compounds, but are able to be determined by preliminary tests. Usually, the treatment is effected at 300°–1500° C. A period of time for heating varies depending on the heating temperature and varieties and uses of the product compounds, but usually 10 minutes–24 hours. The period of time is also determined by preliminary tests.

The heat treatment is usually carried out in an inert gas atmosphere. Alternatively, the treatment may be conducted in air when the treatment is carried out at a temperature of 350° C or lower.

The heat treatment facilitates graphitization of resin matrix of the ion-exchange resin and makes the resin to be porous. Metal ion adsorbed on the ion-exchange resin is left to stand on the porous base matrix in the same conditions as those finely dispersed with ion bond.

The product compound has finely dispersed metal having 50 Å or less, usually 10 Å or less of diameter in size.

The present invention is explained by examples.

EXAMPLE 1

Ion-exchange resin, "Sumikaion" ® KA 890 (Sumitomo Chemical Company, Limited) having a polyalkylene polyamine group and 10 m²/g of BET specific surface area (10 g) was brought into contact with aqueous chloroplatinic acid solution (4 l) containing 1 g/l of Pt under shaking for 15 hours. After being filtered and washed with water, the resin was dried at 60° C. for 6 hours until ion-exchange resin (17.1 g) was obtained on which metal ion, 4 g in terms of Pt, was adsorbed.

All of the resin obtained above was heated from room temperature to 900° C. over 6 hours in a nitrogen atmosphere and further at 900° C. for one hour, to effect graphitization, and then the graphitized compound was treated at 300° C. for 4 hours under a hydrogen atmosphere until finely dispersed metal-carrying spherical compound in black (11.1 g) was obtained.

BRIEF DESCRIPTION OF THE DRAWING

FIG. 1 is X-ray spectrum of the product compound where no peak is observed, i.e., no crystallization appears but carrying in an atomic state is made. X-ray microanalysis of the product compound reveals that the Pt is carried in a cluster form of 10 Å or less in size.

EXAMPLES 2-6

Example 1s were repeated except that ion-exchange resin, metal compound and temperature for graphitization were changed.

| Examples | Ion-exchange resin (varieties of functional) group) | Metal compound | Ion-exchange resin after adsorption (g) | Graphitization temperature (°C.) | Product compound (g) | Size of metal carried (Å) |
|---|---|---|---|---|---|---|
| 2 | "Sumichelate" ® MC-95 (polylakylene polyamino polymethylene phosphonate) | Rhodium chloride | 15.1 | 400 | 10.3 | 10> |
| 3 | "Sumichelate" ® MC-75 (polyalkylene polyamino acetate) | Palladium acetate | 16.7 | 450 | 11.4 | 10> |
| 4 | "Sumichelate" ® Q-10 (Dithiocarbamate) | Chloroauric acid | 16.7 | 800 | 8.9 | 10> |
| 5 | "Sumichelate" ® MC-55 (amidoxime group) | Ruthenium chloride | 15.1 | 900 | 7.2 | 10> |
| 6 | "Sumichelate" ® MC-30 (Iminodiacetate) | Cobalt chloride | 18.8 | 500 | 10.3 | 10> |

We claim:
1. A method for preparing finely dispersed metal carrying compounds which comprises bringing a chelating ion-exchange resin having at least one functional group selected from a polyalkylene polyamine group, an aminocarboxylic acid group and an aminophosphoric acid group into contact with a solution containing metal ion to adsorb the metal ion, and heating the thus treated resin.

2. A method according to claim 1, which further comprises reducing the metal ion.

3. A method according to claim 1 wherein the metal ion is that of metals of Group VIII and/or Group IB and/or Group IVB and/or Group IIIB of the Mendelejeff's Periodic Table.

4. A method according to claim 1 wherein the metal ion is that of Pt, Au, Pd or Rh.

5. A method according to claim 1 wherein the heating is effected at 300°-1500° C. under an inert gas atmosphere.

6. A composition of matter comprising finely dispersed metal-carrying compounds wherein particles of metal carried are 50 Å or less in diameter, said composition being prepared by a method which comprises heating a chelating ion-exchange resin having at least one functional group selected from a polyalkylene polyamine group, an aminocarboxylic acid group and an aminophosphoric acid group and having a metal ion adsorbed thereon.

7. A composition of matter according to claim 6, wherein the metal ion is reduced.

* * * * *